US005485474A

United States Patent [19]
Rabin

[11] Patent Number: 5,485,474
[45] Date of Patent: Jan. 16, 1996

[54] SCHEME FOR INFORMATION DISPERSAL AND RECONSTRUCTION

[75] Inventor: Michael O. Rabin, Cambridge, Mass.

[73] Assignee: The President and Fellows of Harvard College, Cambridge, Mass.

[21] Appl. No.: 702,110

[22] Filed: May 15, 1991

Related U.S. Application Data

[63] Continuation of Ser. No. 160,356, Feb. 25, 1988, abandoned.
[51] Int. Cl.⁶ .................................................. H03M 13/00
[52] U.S. Cl. ........................ 371/37.1; 371/39.1; 371/40.1
[58] Field of Search ................................ 371/37.1, 39.1, 371/30, 40.1

[56] References Cited

PUBLICATIONS

Blakley, G., "Safeguarding Cryptographic Keys", AFIPS Conf. Proc., vol. 48, 1979, pp. 313–317.
Blakley, G., "One–Time Pads are Key Safeguarding Schemes, Not Cryptosystems . . . ", Proc. 1980 Symp. on Security and Privacy, pp. 108–113.
Asmuth, Blakley ("Pooling, Splittting, and Restituting Information to Overcome Total Failure of some Channels of Communications", Proc. of the 1982 Symp. on Security and Privacy, IEEE, 1982, pp. 156–169).
Rabin ("Fingerprinting by Random Polynomials", TR–15–18, Center for Research in Computing Technology, Harvard Univ., Cambridge, Mass., 1981).
Blakley, Meadows ("Security of Ramp Schemes", Proc. of CRYPTO, 1984, pp. 242–268).
Pippenger ("Parallel Communication with Limited Buffers", IEEE 25th Symp. on FOCS, 1984, pp. 127–136).
Rabin ("Probabilistic Algorithms in Finite Fields", SIAM J Compt., vol. 9, 1980, pp. 273–280).
Shamir ("How to Share a Secret", Comm. ACM, vol. 22:11, 1979, pp. 612–613).
Valiant ("A Scheme For Fast Parallel Communication", SIAM J. Compt., vol. 11:2, 1982, pp. 350–361).

Rao, T., "Joint Encryption and Error Correction Schemes", Proc. 10th Int'l. Symp. on Computer Architecture, Computer Society Press, pp. 240–241, 1984.

(List continued on next page.)

Primary Examiner—Stephen M. Baker
Attorney, Agent, or Firm—Fish & Richardson

[57] ABSTRACT

Method and apparatus applicable to a variety of data storage, data communication, and parallel computing applications, efficiently improving information availability and load balancing. Information to be transmitted in a data signal or stored is represented as N elements of a field or computational structure, and dispersed among a set of n pieces that are to be transmitted or stored in a manner yielding no fewer than m pieces used in subsequent reconstruction.

For dispersal, n vectors $a_i$ each having m elements are used and the n pieces are assembled from elements obtained as products of these vectors with m element groups taken from the N elements representing the information. For reconstruction from m available pieces, m m-element vectors $\alpha_i$ are derived from the vectors $a_i$, and the N elements representing the information are obtained as products of these vectors with m-element groups taken from the pieces.

The vector products may be implemented using an appropriate processor, including a vector processor, systolic array, or parallel processor.

For fault-tolerant storage in a partitioned or distributed system, information is dispersed into n pieces so that any m suffice for reconstruction, and the pieces are stored in different parts of the medium.

For fault-tolerant and congestion-free transmission of packets in a network or a parallel computer, each packet is dispersed into n pieces so that any m pieces suffice for reconstruction and the pieces are routed to the packet's destination along independent paths or at different times.

30 Claims, 7 Drawing Sheets

PUBLICATIONS

Kahn, R., "The Organization of Computer Resources into a Packet Radio Network", *IEEE Trans on Communications,* vol. COM–25, No. 1, Jan. 1977, pp. 169–177.

Wu, W., *Elements of Digital Satellite Communications, vol. II: Channel Coding and Integrated Services Digital Satellite Networks,* Computer Science Press, 1985, pp. 158–171.

Meyer, C. et al., *Cryptography: A New Dimension in Computer Data Security,* John Wiley & Sons, 1982, pp. 212–213.

McEliece et al., "On Sharing Secrets and Reed–Solomon Codes", *Commun. of the ACM,* vol. 24, No. 9, Sep. 1981, pp. 583–584.

Karnin et al., "On Secret Sharing Systems", *IEEE Trans. on Information Theory,* vol. IT–29, No. 1, Jan. 1983, pp. 35–41.

$$\begin{cases} a_1 \ (a_{1,1} \ldots \ldots a_{1,m}) \\ \quad \vdots \\ a_n \ (a_{n,1} \ldots \ldots a_{n,m}) \end{cases}$$

FIG. 3

$$F = \underbrace{b_1 \ldots b_m}_{S_1} \underbrace{b_{m+1} \ldots b_{2m}}_{S_2} \cdots \underbrace{b_{N-m+1} \ldots b_N}_{S_{Nm}}$$

$$A = \begin{bmatrix} a_{1,1} & a_{1,2} & \ldots & a_{1,m} \\ a_{v,1} & a_{v,2} & \ldots & a_{v,m} \\ a_{m,1} & a_{m,2} & \ldots & a_{m,m} \end{bmatrix}$$

FIG. 6

$$A \cdot \begin{bmatrix} b_1 \\ \vdots \\ b_m \\ \downarrow \\ S_l \end{bmatrix} = \begin{bmatrix} c_{1,l} \\ \vdots \\ c_{m,l} \end{bmatrix}$$

FIG. 7

$$A^{-1} = \begin{bmatrix} d_{1,1} & d_{1,2} & \ldots & d_{1,m} \\ & \vdots & & \\ d_{m,1} & d_{m,2} & \ldots & d_{m,m} \end{bmatrix}$$

FIG. 8

$$\begin{bmatrix} b_1 \\ \vdots \\ b_m \\ \downarrow \\ S_l \end{bmatrix} = A^{-1} \begin{bmatrix} c_{1,l} \\ \vdots \\ c_{m,l} \end{bmatrix}$$

FIG. 9

$$F = \underbrace{b_1 \; b_2}_{S_1} \; \underbrace{b_3 \; b_4}_{S_2} \; \underbrace{b_5 \; b_6}_{S_3} \; \underbrace{b_7 \; b_8}_{S_4}$$

$$a_1 = a_{1,1} \quad a_{1,2} \qquad a_3 = a_{3,1} \quad a_{3,2}$$

$$a_2 = a_{2,1} \quad a_{2,2} \qquad a_4 = a_{4,1} \quad a_{4,2}$$

$$T_1 = C_{1,1}, C_{1,2}, C_{1,3}, C_{1,4} = (a_{1,1} b_1 + a_{1,2} b_2)(a_{1,1} b_3 + a_{1,2} b_4)(a_{1,1} b_5 + a_{1,2} b_6)(a_{1,1} b_7 + a_{1,2} b_8)$$

$$T_2 = C_{2,1}, C_{2,2}, C_{2,3}, C_{2,4} = (a_{2,1} b_1 + a_{2,2} b_2)(a_{2,1} b_3 + a_{2,2} b_4)(a_{2,1} b_5 + a_{2,2} b_6)(a_{2,1} b_7 + a_{2,2} b_8)$$

$$T_3 = C_{3,1}, C_{3,2}, C_{3,3}, C_{3,4} = (a_{3,1} b_1 + a_{3,2} b_2)(a_{3,1} b_3 + a_{3,2} b_4)(a_{3,1} b_5 + a_{3,2} b_6)(a_{3,1} b_7 + a_{3,2} b_8)$$

$$T_4 = C_{4,1}, C_{4,2}, C_{4,3}, C_{4,4} = (a_{4,1} b_1 + a_{4,2} b_2)(a_{4,1} b_3 + a_{4,2} b_4)(a_{4,1} b_5 + a_{4,2} b_6)(a_{4,1} b_7 + a_{4,2} b_8)$$

$$A = \begin{bmatrix} a_{1,1} & a_{1,2} \\ a_{3,1} & a_{3,2} \end{bmatrix} \qquad A^{-1} = \begin{bmatrix} d_{1,1} & d_{1,2} \\ d_{2,1} & d_{2,2} \end{bmatrix}$$

$$b_1 = d_{1,1} C_{1,1} + d_{1,2} C_{2,1}$$
$$b_2 = d_{2,1} C_{1,2} + d_{2,2} C_{2,2}$$
$$b_3 = d_{1,1} C_{1,3} + d_{1,2} C_{2,3}$$
$$b_4 = d_{2,1} C_{1,4} + d_{2,2} C_{2,4}$$
$$b_5 = d_{1,1} C_{1,1} + d_{1,2} C_{2,1}$$
$$b_6 = d_{2,1} C_{1,2} + d_{2,2} C_{2,2}$$
$$b_7 = d_{1,1} C_{1,3} + d_{1,2} C_{2,3}$$
$$b_8 = d_{2,1} C_{1,4} + d_{2,2} C_{2,4}$$

ALL OPERATIONS ARE IN THE FINITE FIELD E USED IN THE PROCEDURE

FIG. 10

$$a_i = \left( \frac{1}{x_i \; y_1} \; \cdots \; \frac{1}{x_i \; y_m} \right) \qquad x_i + y_j = 0 \text{ for all } i \text{ and } j$$

$$x_i \neq x_j \text{ and } y_i \neq y_j \text{ for } i \neq j$$

SCHEME FOR INFORMATION DISPERSAL AND RECONSTRUCTION

This is a continuation of application(s) Ser. No. 07/160,356 filed on Feb. 25, 1988, now abandoned.

BACKGROUND OF THE INVENTION

This invention relates to dispersal and reconstruction of information during communication or storage and retrieval, in order to achieve fault tolerance and load balancing.

When information is communicated or stored, it may be lost if the communication link or storage medium fails. One straightforward, but inefficient, way to reduce the chance of loss is simply to transmit duplicate copies of the information over different communication links or to store duplicate copies in different storage locations. By providing enough duplicate copies, the likelihood that all copies will be lost can be made as small as desired. But this fault tolerance is achieved only at great cost in transmission or storage resources.

Asmuth, et al., "Pooling, splitting, and restituting information to overcome total failure of some channels of communication," Proc. of the 1982 Symp. on Security and Privacy, IEEE Soc. (1982), pp. 156–169, propose an algorithm for splitting and restituting information that applies to specific small cases of the problem, and is based on number theoretic computations, namely the Chinese remaindering method.

Conventional error correction codes add extra bits to a binary message to create a block such that any k errors (bit reversals or lost bits) that occur in the block during transmission or storage can be corrected.

SUMMARY OF THE INVENTION

In one aspect, the invention features an efficient and fault tolerant method for dispersing N characters of information, intended to be transmitted in a data signal or stored as a data file, among a set of n pieces that are to be transmitted or stored in a manner that is expected to yield no fewer than m pieces for use in subsequent reconstruction of the information; in the invention, the N characters are grouped into N/m groups, each containing m characters, the characters being elements of an appropriate field or computational structure; a set of vectors $a_i$ is selected, each having m coordinates, there being as high as desired a probability (up to complete certainty) that any given subset of m of the vectors are linearly independent; a set of elements $c_{i,r}$ is generated for assembly into the n pieces, each element being calculated as the product of the vector $a_i$ times the characters of the r-th group of characters; and the n pieces are generated such that the i-th piece is an assemblage of the elements $c_{i,r}$, r=1, . . . , N/m.

If expressed in bits, the size of each element comprising the pieces is nearly the same as (and can in fact be made exactly the same as) the size of each of the original characters. Thus the total size in bits of each of the pieces is nearly (or if desired exactly) equal to 1/m of the size in bits of the original information, and the original information may be reconstructed from a set of bits that numbers no greater than the number of original information bits.

In another aspect, the invention features a method for reconstructing information from an available set of m pieces that were generated by dispersing the information in accordance with the method described above; an m×m matrix is formed whose rows are the m vectors $a_i$ that were used to form the elements $c_{i,r}$ of the available m pieces; the m×m matrix is inverted; the N characters of the information are generated by multiplying the inverted matrix times groups of the elements $c_{i,r}$; and the N characters are reassembled to form the original information.

In another aspect, the invention features a method for storing and retrieving information in a storage medium of the kind having portions prone to faults and in which a fault of any portion does not necessarily also entail a fault in any other portion; the method includes dispersing the information into n pieces in accordance with the method described above; storing the n pieces in the portions of the storage medium, at least some pieces being stored in different portions; retrieving at least m pieces from the storage medium; and reconstructing the information from the m pieces in accordance with the method described above.

In another aspect, the invention features a method for communicating information over communication links prone to faults and in which a fault of any link does not necessarily also entail a fault in any other link; the method uses the dispersal and reconstruction techiques described above; the n pieces are transmitted over the links, at least some pieces being transmitted on different links, and at least m pieces are received at a destination from the links, for use in the reconstruction.

In another aspect, the invention features a method for distributing information in a distributed processing system of the kind having nodes with associated storage devices, the nodes being interconnected in a network, and in which the storage devices are prone to faults and in which a fault of any storage device does not necessarily also entail a fault in any other storage device; the information is dispersed into n pieces in accordance with the method described above, the pieces are distributed to the storage devices at different nodes via the network, at least m peices are retrieved from the storage devices via the network, and the information is reconstructed from the m pieces in accordance with the method described above.

Another aspect of the invention features a method for communicating information packets among the nodes of a parallel processing computer, each node having an associated processor, memory, information dispersal/reconstruction unit, and a buffer, the nodes being linked by an interconnecting network, whereby each node can communicate with any other node via paths at least some of which pass through intermediate nodes, the paths being subject to failure, each node's buffer having a finite capacity, each information packet to be sent from a source node to a destination node; in this aspect of the invention, the information packet is dispersed into n pieces in accordance with the method described above, the pieces are sent via different paths of the network toward the destination node, at least m pieces are received from the network at the destination node, and the information packet is reconstructed from the m pieces in accordance with the method described above.

Preferred embodiments of the invention include the following features. The information is a file comprising a string of N characters, all characters bieng equal-sized bytes and the groups comprise segments of the string, each segment consisting of a sequence of successive characters. Each byte is considered as an element of a finite field whose size is at least as large as (preferably no larger than) the size of the alphabet of possible characters (for example, the field $Z_p$ of residues (mod p) where p is a prime number greater than the highest-valued possible byte, or, for q-bit long bytes, the field $GF(2^q)$ or any other finite field E). Fingerprints are generated based on the pieces in a manner to be detailed later on, the fingerprints are communicated or stored and later tested for authenticity as the basis for deciding whether to accept any of the pieces for the process of reconstructing the field.

The invention also features apparatus for performing the methods described above. In the apparatus, the vector products may be performed by a calculator having a cache memory connected to an associated processor in the form of either an arithmetic unit, a vector processor, a systolic array processor, or a set of any of them in parallel. Because n/m can be chosen to be close to 1, the total number of elements (n/m).N in the dispersed pieces need not be much larger than the number of bytes in the original file F, and the number of elements in the m pieces required for reconstruction need not be any greater than the number of bytes in the original file; thus, the scheme is space efficient. Fingerprinting is useful in thwarting a saboteur from substituting a bogus piece for a good one. The dispersal and reconstruction procedures are computationally efficient, realizable on a variety of devices including general purpose or customized processors, pipelined and systolic arrays, and parallel or vectorized devices, and applicable in many contexts, including secure and reliable storage on disks and in distributed systems, fault-tolerant and efficient transmission of information in networks, and communications between processors in parallel computers.

Other advantages and features will become apparent from the following description of the preferred embodiment and from the claims.

DESCRIPTION OF THE PREFERRED EMBODIMENT

We first briefly describe the drawings.

FIG. 10 is an illustration of dispersal and reconstruction.

FIG. 11 is an expression related to generating vectors $a_i$ used for dispersal.

STRUCTURE AND OPERATION

Figure 1:
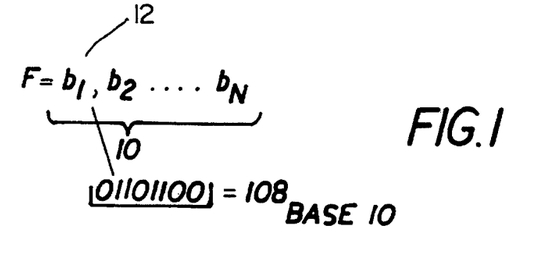
FIG. 1 is a diagram of the composition of an information file F to be communicated or stored.

Referring to FIG. 1, a string 10 of N bytes 12 makes up a file F to be transmitted or stored. Each byte 12, denoted $b_j$, $j=1, \ldots, N$, is, for example, an eight-bit byte representing an integer in the range from 0 to 255. Byte $b_1$ is shown as representing $108_{base\ 10}$. Thus, for some prime number p larger than B (where B is the upper end of the range of integers represented by the eight-bit bytes, i.e., 255), the file F is a string of characters $b_j$ each of which is a residue, mod p, i.e., an element in the finite field $Z_p$=residues mod p. For example, if p=257, then a byte b=11001011=$203_{base\ 10}$ is represented as a residue of b (mod p), namely 203 (mod 257). It is possible to use any finite field that contains at least as many elements as the number of possible characters in the alphabet of characters from which F is assembled. The field $Z_p$, referred to above, has 257 elements and thus requires 9 bits to represent all possible elements, i.e., one more bit than the 8-bit length of $b_j$. Alternatively, for q-bit bytes, one could use a field $E= GF(2^q)$, e.g., for 8-bit bytes we could use the field $E=GF(2^8)$ of characteristic 2 having 256 elements. We only need an irreducible polynomial p(X), an element of $Z_2[X]$ of degree 8, to effectively compute in the field E, as explained in Rabin, "Probabilistic algorithms in finite fields", SIAM J. on Computing, 1980, pp. 273–280, incorporated herein by reference.

We are going to derive from the information comprising F a number of pieces to be stored or communicated. We expect no more than some number (denoted by k) of the pieces to be lost in storage or communication. Our goal is to be able to reconstruct F from the pieces that remain (numbering at least m). Then n=m+k will be the number of original pieces. Given k, we choose m such that n/m is no greater than 1 +$\epsilon$ for some acceptable value of $\epsilon$. That is, n is greater than m by an amount that makes n/m greater than 1 by at most $\epsilon$. For example, n, m, and k could be 6, 4, and 2, respectively. In this case, any two pieces may be lost while still allowing the file to be reconstructed from the four remaining pieces; then $\epsilon$ would be ½, i.e., the information overhead for this degree of fault tolerance is just 50%. If n, m, and k were instead 6, 5, and 1, then e would be ⅕, an information overhead of just 20%. Thus $\epsilon$ is a measure of how many lost pieces can be tolerated as a proportion of the number of surviving pieces, without jeopardizing the ability to reconstruct F.

Figure 2:
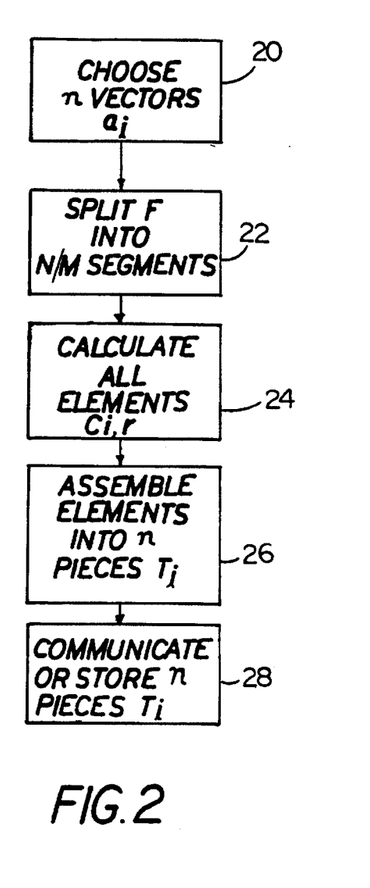
FIG. 2 is a flow chart of a dispersal procedure.
Figure 3:
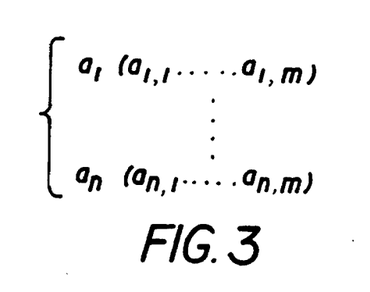
FIG. 3 is a diagram of n vectors $a_1, \ldots, a_n$.

Referring to FIG. 2, to generate the n pieces to be communicated or stored, given the original file F, first choose (20) n vectors $a_i$ (see FIG. 3), each consisting of m coordinates $a_{i,1}, \ldots, a_{i,m}$ that are all elements of the finite field being used. The m coordinates for each vector $a_i$ are chosen (in a manner described below) so that any subset of m of the vectors $a_i$ are linearly independent (or, at least, so that with high probability a randomly chosen subset of m of the vectors $a_i$ are linearly independent).

Figure 4:
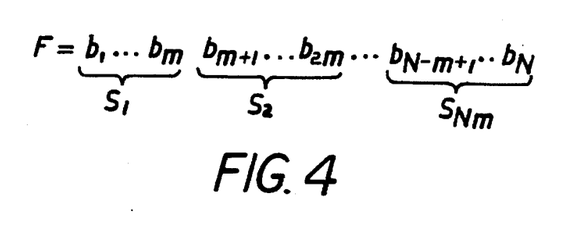
FIG. 4 is a diagram of the segmentation of file F.

Next, split (22) the characters of F into N/m equal length segments $s_q$, each m characters long (see FIG. 4). For example if N=10,000, and (as above) m= 4, then there are 2500 segments $s_q$ each 4 characters long.

Then the n pieces to be communicated or stored, called $T_i$, are assembled as strings of newly constructed elements, $c_{i,r}$, i=1, \ldots, n, r=1, \ldots, N/m, i.e., $T_i=c_{i,1}, \ldots, c_{i,N/m}$, i=1, \ldots, n. Each element $c_{i,r}$ is calculated (24) as the vector product, in the finite field, of vector $a_i$ and segment $s_r$:

$$c_{i,r}=a_i \cdot s_r=a_{i,1} \cdot b_{(r-1)m+1} + \ldots + a_{i,m} b_{rm}.$$

The elements are then assembled (26) into the n pieces $T_i$.

The pieces may then be fingerprinted for later authentication, as discussed below. Finally the n pieces $T_i$ (and the fingerprints, if any) are communicated or stored (28) on separate communication links or storage locations (separate in the sense that a loss of one or more of the pieces will not necessarily imply a loss of any other piece).

Suppose that, following communication or storage, only m of the n pieces $T_i$ are available for reconstruction of F. (We assume that the elements c were subjected to conventional error correction coding and decoding so that there are no bit errors in the m pieces available for reconstruction.) Our goal is to derive all of the original characters (bytes) of F, i.e., the $b_j$, j=1, . . . , N, from the elements $c_{i,r}$.

Figure 5:
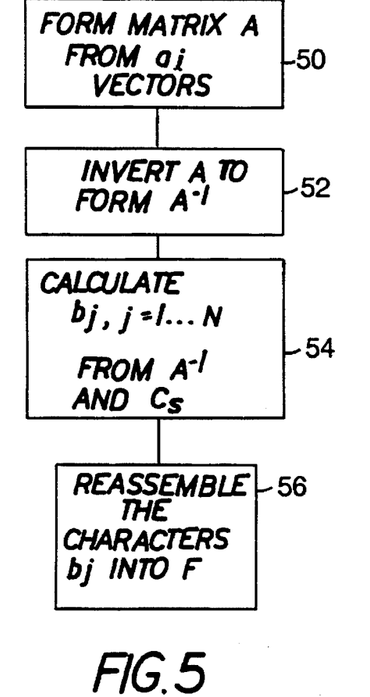
FIG. 5 is a flow chart of a reconstruction procedure.
Figure 6:
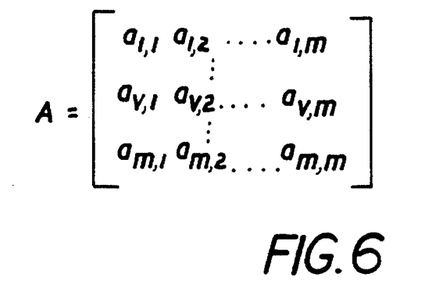
FIG. 6 is a diagram of a matrix A, where the pieces available for reconstruction are the first m pieces, $T_1, \ldots, T_m$.
Figure 7:
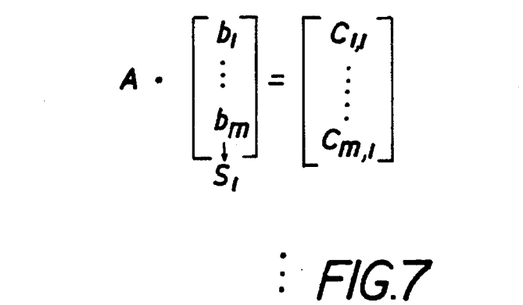
FIG. 7 is a diagram of the computation of the first elements for each of the n pieces to be communicated or stored.

Referring to FIG. 5, we first form (50) a square m×m matrix A (see FIG. 6) having as its rows m of the originally chosen vectors $a_i$, such that the vectors $a_v$, v=1, . . . , m, in matrix A are those m of the original n vectors $a_i$ that were used to generate the elements c of the m pieces $T_i$ now available for reconstruction of F. For simplicity, we assume (without loss of generality) that matrix A contains the first m vectors $a_i$. FIG. 7 shows that it was the matrix A multiplied by the first segment $s_1$ of F that generated the original first elements $c_{1,1}, \ldots, c_{m,1}$, of the available m pieces $T_i$. Thus A times $s_r$, r=1, . . . , m generated all of the original elements of all m available pieces $T_i$.

Figure 8:
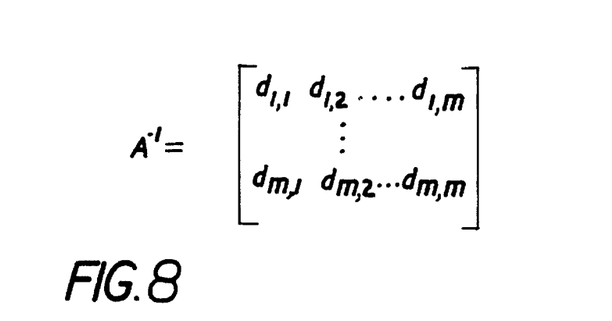
FIG. 8 is a diagram of the inverse matrix $A^{-1}$.
Figure 9:
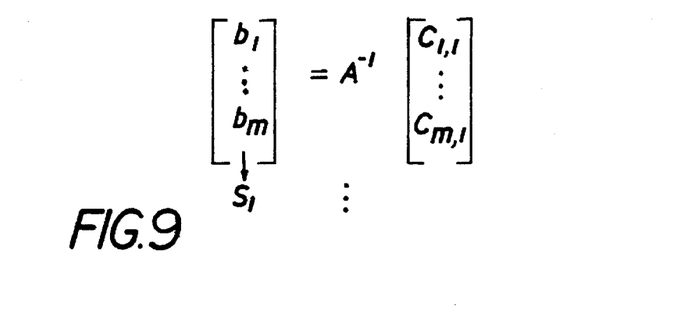
FIG. 9 is a diagram of the computation of the first m characters of F during reconstruction.

Next, invert (52) matrix A once and for all to form the inverted matrix $A^{-1}$ (see FIG. 8) where the v-th row of $A^{-1}$ is $d_{v,1}, \ldots, d_{v,m}$. Now, from FIG. 7, it is clear that the original segments $s_r$, r=1, . . . , n, of F can each be calculated (54) by multiplying $A^{-1}$ times the vector assembled from the r-th elements of all of the m available pieces (see FIG. 9). If we express j as j=mr+v, where r and v are integers, v=1, . . ., m, r=0, . . . , N/m, then each $b_j$, j=1, . . . , N, is calculated as row v of the inverse matrix $A^{-1}$ times the vector (column) consisting of the r-th elements of all of the m available pieces $T_i$.

Finally, we reassemble (56) the characters $b_j$ into F.

Referring to FIG. 10, in a simple example, if F is N=8 bytes long, if there are four pieces $T_i$ to be transmitted or stored (n=4), and if two of them will be available for reconstruction (m=2, and k=2), then F is split into N/m=4 segments ($s_1, \ldots, s_4$). There are four vectors $a_i$ each two coordinates long, and four pieces $T_i$ each with four elements c. All operations for calculating the $T_i$s are performed in the finite field. Now suppose that $T_2$ and $T_4$ are lost and $T_1$ and $T_3$ are available for reconstruction. Then the matrix A is a 2×2 matrix, the inverse matrix $A^{-1}$ is a 2×2 matrix, with elements d, and the bs are reconstructed from the ds and cs as described above.

In order to satisfy the requirement that the vectors $a_i$ be linearly independent, we may choose the $a_i$, i=1, . . . , n, as in FIG. 11, where $x_1, \ldots, x_n$ and $Y_1, \ldots, y_m$ are all elements of the finite field, which satisfy the condition that $x_i+y_j \neq 0$ for all i and j, and for i≠j, $x_i \neq x_j$ and $y_i \neq y_j$, that is, all of the xs are different, all of the ys are different, and no sum of an x and a y is 0.

If A is a matrix with rows consisting of any m of the vectors $a_1, \ldots, a_n$, then it can be shown that its rows $a_i$ are linearly independent.

The inverse matrix $A^{-1}$ need be calculated only once and can be calculated in a number of operations that is proportional to $m^2$.

Figure 12:
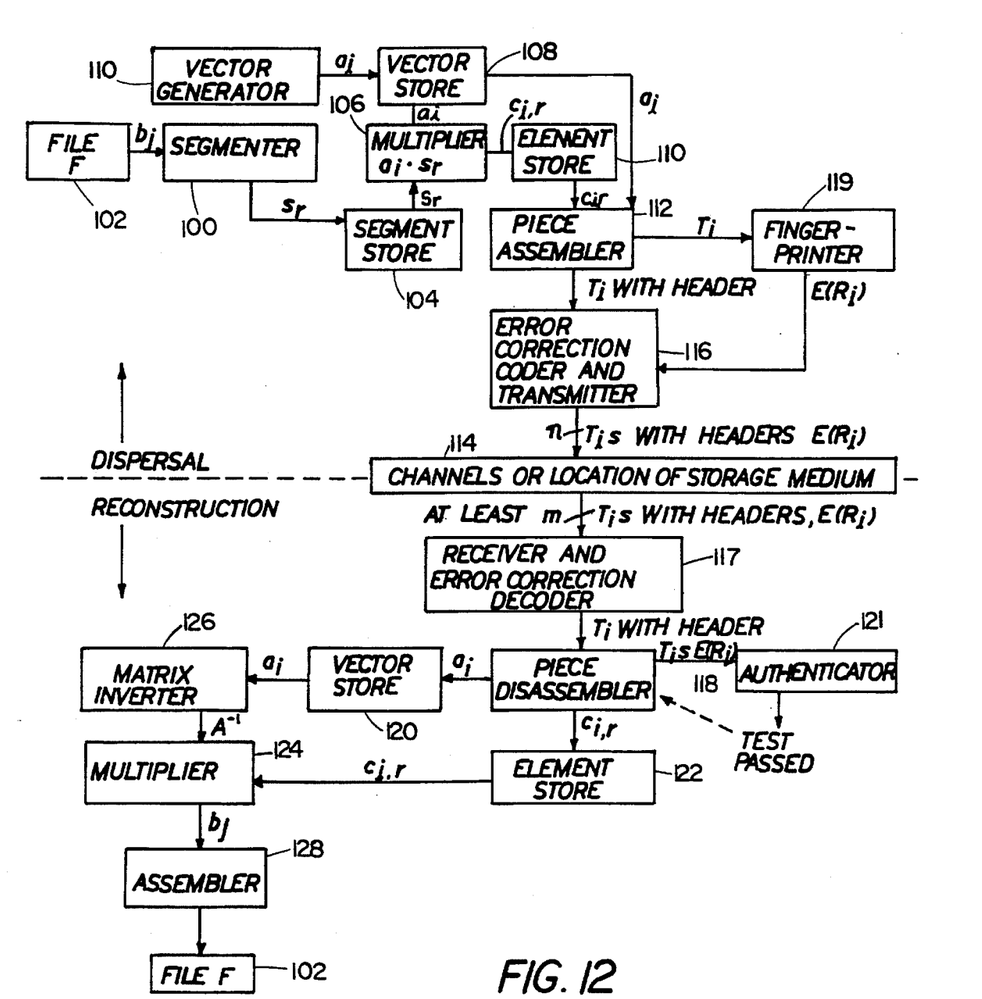
FIG. 12 is a block diagram of dispersal and reconstruction apparatus.

The dispersal and reconstruction techniques could be implemented, for example, by appropriately programmed general purpose processors or, referring to FIG. 12, by dedicated hardware elements.

In FIG. 12, a segmenter 100 receives the sequence of character $b_j$ that comprise the file F 102, and organizes them in segments $s_r$, which are written temporarily into a segment store 104. A multiplier 106 multiplies the characters of the various segments by the appropriate vectors $a_i$ that were temporarily written into a vector store 108 by a vector generator 110 (or were otherwise made available in the vector store 108). The resulting elements $c_{i,r}$ are stored temporarily in an element store 110. A piece assembler 112 assembles the $c_{i,r}$ for each piece $T_i$ (including for each piece a header comprising either the vector $a_i$ used to generate the piece, or merely the index i of the vector in case the vectors are known to the device that is to perform the reconstruction). Each piece $T_i$ may also be fingerprinted in a fingerprinter 119 which delivers an encrypted fingerprint $E(R_i)$ to coder and transmitter 116 for transmission or storage with $T_i$. The pieces $T_i$ (and fingerprints, if any) then are sent in n independent ways to a channel or storage medium 114 by error correction coder and transmitter 116.

For reconstruction, at least m of the n error correction coded pieces $T_i$ (including headers and fingerprints, if any) enter a receiver and error correction decoder 117 which delivers each decoded $T_i$ (including its header) to a piece disassembler 118 and delivers each piece and fingerprint to an authenticator 121.

Authenticator 121 tests the fingerprints for authenticity (in a manner described below). If the i-th test is passed, the piece disassembler 118 splits that piece into the vector $a_i$ (which is sent to a temporary vector store 120) and the individual elements $c_{i,r}$ (which are sent to a temporary element store 122). A multiplier 124 multiplies the vectors each consisting of the elements $c_{i,r}$ of the available pieces by the inverted matrix $A^{-1}$, which is generated from the stored $a_i$ vectors by a matrix inverter 126. The resulting characters $b_j$ are assembled in an assembler 128 to regenerate file F 102.

Figure 13:
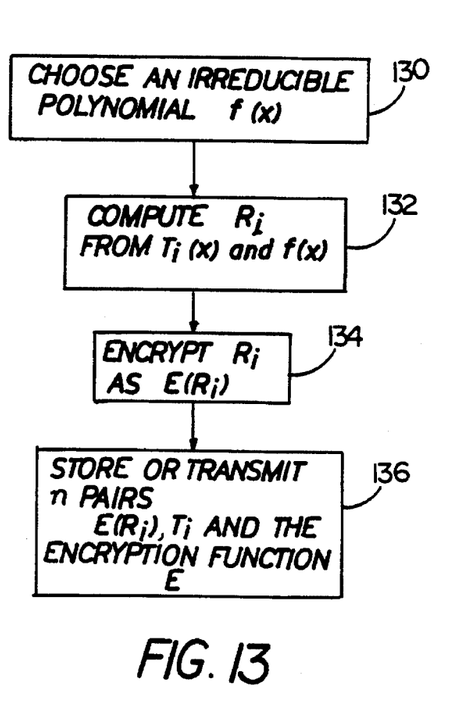
FIGS. 13, 14 are flow charts of procedures for generating a fingerprint during dispersal and testing the authenticity of the fingerprint during reconstruction.

Referring to FIG. 13, to minimize the security risk that a bogus string of characters deliberately substituted for one of the pieces $T_i$ will not be discovered, a fingerprint may be calculated for each piece $T_i$ during dispersal as follows. Choose (130) any irreducible polynomial f(x), an element of the field of polynomials whose coefficients are in the finite field. Then expressing a piece $T_i$ (including its header) as a polynomial, $T_i(x)$, compute (132) $R_i$, the residue of $T_i(x)$ (mod f(x)). Next encrypt (134) $R_i$ using an encryption function E and store or transmit (136) the n pairs ($E(R_i), T_i$), as well as the encryption function E. $E(R_i)$ is the fingerprint.

Figure 14:
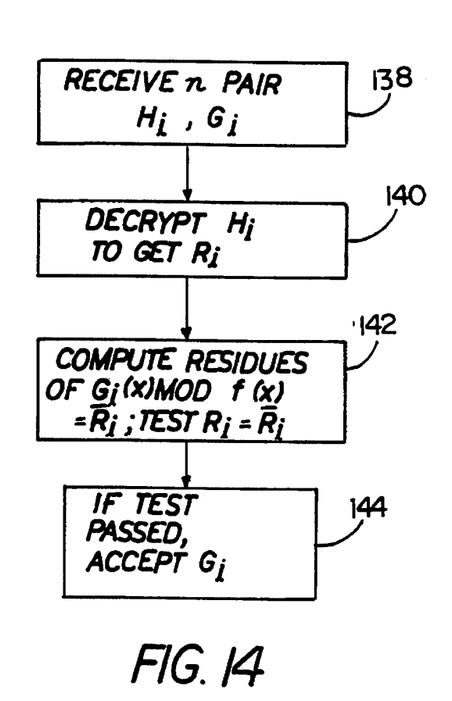

Referring to FIG. 14 in the reconstruction process, for each received (138) pair $H_i$ (the fingerprint) and $G_i$ (the corresponding piece), decrypt (140) $H_i$, and test (142) it against the residue of $G_i$ (mod f(x)). Only if they are equal is $G_i$ accepted as one of the pieces $T_i$. The technique is discussed in Rabin, "Fingerprinting by Random Polynomials" TR-15-81, Center for Research in Computing Technology, Harvard University, (1981), incorporated herein by reference. It is also proven there that an adversary, if ignorant of f(x), has an exponentially small probability of generating a proper pair $H_i$, $G_i$, which will pass the authentication test.

The dispersal and reconstruction technique has a variety of applications.

Figure 15:
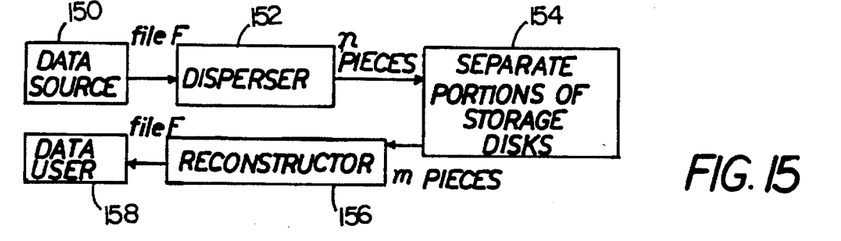
FIGS. 15, 16, 17, 18 are block diagrams of applications of the invention.

For example, referring to FIG. 15, file F may be generated by a data source 150. A disperser 152 (e.g., as shown in the upper half of FIG. 12) would generate n pieces from F and deliver them for storage on n different portions of a storage disk 154. Assume that, despite faults on the disk (or head crashes), at least m of the pieces may be successfully retrieved. Then a reconstructer 156 (e.g., as shown in the lower half of FIG. 12) can reconstruct F from the m pieces for delivery to a data user 158.

Figure 16:
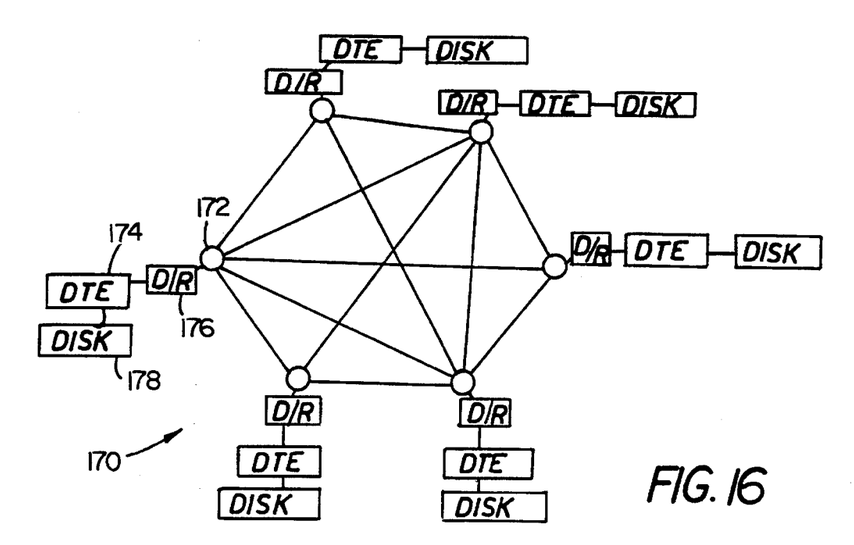

Referring to FIG. 16, in another application, a distributed processing system 170 includes a network of nodes 172 each serving a data terminal equipment (DTE) 174 via a disperser/reconstructor (D/R) 176, and each IDTE has an associated disk storage 178. If a user of DTE 174 wishes to store a file efficiently while assuring that it may later be reconstructed, he could cause the file to be dispersed into n pieces. The n pieces would be delivered to n different nodes for storage in their associated disk storage units. Then despite failure of any k of those disk storage units, m of the pieces will survive and be sufficient to reconstruct F. This advantage is achieved with a relatively small information overhead, e.g., 25%. Furthermore, the use of this fault tolerant storage approach by all of the node users will conveniently and automatically balance the information load at the various disk units, because the stored pieces are distributed relatively evenly among the nodes.

Figure 17:
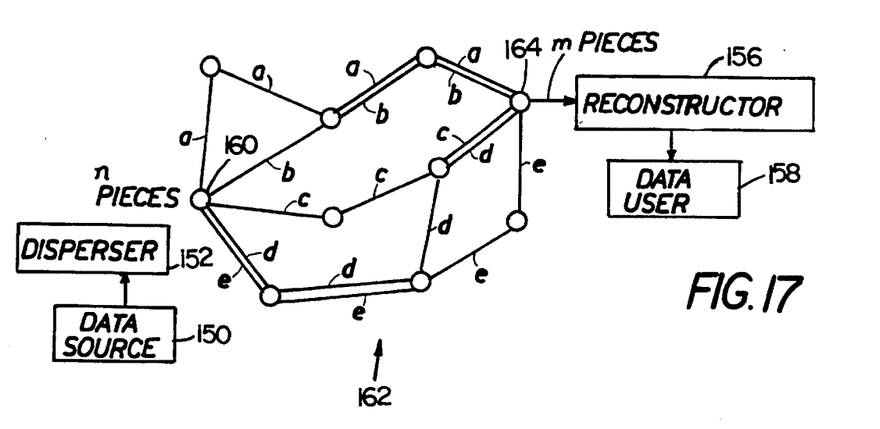

Referring to FIG. 17, in another application, the data source 150 and disperser 152 may be associated with a node 160 of a multiple-node communication network 162. Reconstructer 156 and data user 158 are associated with a distant node 164. The n pieces generated by disperser 152 are sent via n different paths (five paths a, b, c, d, e are labeled). If at least m pieces reach node 164, then, despite failures of some communication links, the file F may be fully recovered. This application entails the additional benefit of distributing and balancing the transmission load over all links of the network. Network 162 could be a satellite network.

Figure 18:
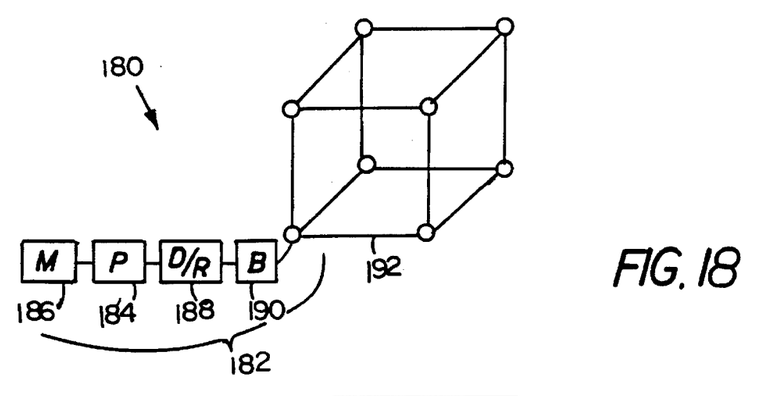

Referring to FIG. 18, in another application, a parallel processing computer 180 has K nodes 182 each having an associated processor 184, a memory 186, an information dispersal/reconstruction unit 188, and a buffer 190. Each node is connected to n or more other nodes by direct links, the totality of all these links constituting the intra-computer communications network. In a transmission round, every node holds in its memory certain information comprising a packet and needs to send this packet to some destination node (determined by the source node). All packets are to be transmitted concurrently from sources to destinations along paths, each path comprised of a sequence of direct links 192 and typically passing through intermediate nodes. The buffer provided at each node serves to temporarily store all pieces of information passing through that node in transit from sources to destinations. The size of that buffer, measured in bytes, is typically a fixed multiple of the packet size. FIG. 18 illustrates a particular embodiment of such a parallel computer having $K=2^n$ (for n=3) nodes which is organized as the n-dimensional binary cube, where every node is directly linked to its n neighbors in the n-cube.

In general, to send a packet, a disperser/reconstructer 185 disperses the packet into n pieces and appends to each piece a ticket that specifies the succession of nodes through which that piece must pass on its way to the destination. The computer operates in cycles such that in each cycle each piece of packets that are in transit traverses one more link on its route to its destination, and is stored in the buffer of the node that it reaches at the end of that cycle. Thus a piece may be lost if either a link along its route fails or a buffer of a node along its route is full when the piece arrives. It can be shown that, by using the dispersal and reconstruction procedures described above, the computer system will exhibit fast transmission time, with small fixed buffer size, high probability that packets will reach their destinations, high fault tolerance in the face of link failures, excellent load balancing among the nodes, and relatively low information overhead.

Figure 19:
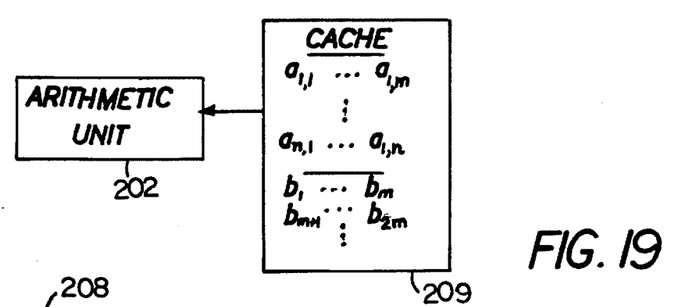
FIGS. 19, 20, 21 are block diagrams of hardware implementations.
Figure 20:
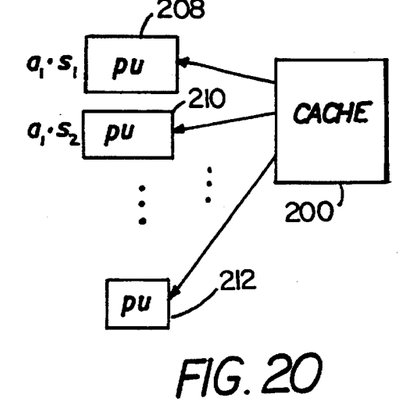
Figure 21:
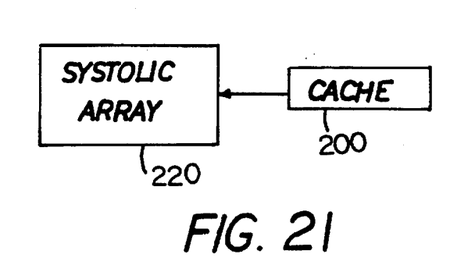

Referring to FIG. 19 the vector multiplication portions of the dispersal and reconstruction procedures could be performed rapidly by a high-speed arithmetic unit 202 attached to a high-speed cache memory 200. In dispersal, the vectors $a_i$, i=1, ..., n would be brought into cache. Groups of characters $s_1, s_2, ...$ would also be brought into cache in blocks as large as permitted by the cache size. Then, in computing the products $a_1 \cdot s_1, a_1 \cdot s_2, ...$ all required data is directly available to arithmetic unit 202 for fast processing. Similarly, for reconstruction, the rows of the inverse matrix $A^{-1}$ would be placed in cache together with as many columns of elements $c_{i,r}$ as cache size permits, for fast reconstruction of the characters $b_j$. Alternatively, arithmetic unit 202 may be a vector processor capable of performing the vector products directly on vectors drawn from the cache. In another arrangement, referring to FIG. 20, a number of processing units 208, 210, 212 may be connected in parallel to cache 200 with each processing unit assigned to perform one of the products, e.g., $a_1 \cdot s_1$. In that case, cache 200 can be a multi-component unit with each unit dedicated to serving one of the processing units. Referring to FIG. 21, cache 200 alternatively could be connected to a systolic array 220 for performing the multiplications. Each processing unit of FIG. 20 could be a vector processor or a systolic array.

Other embodiments are within the following claims.

For example, another technique for assuring that any m of the vectors $a_i$ are linearly independent is to choose n elements $e_1, ..., e_n$ of the finite field and define $a_1=(1, e_i, ..., e_i^{m-1})$ for i=1, ..., n. Or if we want every $a_i$ to depend on more than one element $e_i$, we simply choose $a_i=(a_{i,1}, ..., a_{i,m})$ randomly by randomly and independently selecting $a_{i,j}$ from the field. It can be shown that, if the field has q elements, than A is non-singular with a probability nearly $1-1/q$. By choosing q large enough, the probability can be made to be as close to 1 as possible.

Other authentication approaches could be used as well.

Other hardware implementations are also possible.

We claim:

1. A process for protecting against loss and for enhancing accessibility in storage or memory, or protecting against loss and enhancing speed of transmission on communication paths, of information which is represented in storage or memory, or represented as data signals on communication paths, said information comprising data elements, each said data element representable as an element of a finite field or computational structure, said process comprising transforming and breaking apart said information among a set of smaller assemblages of elements of said finite field or computational structure, and dispersing said information by transmitting said smaller assemblages in the form of said data signals carried on multiple communication paths, or by transmitting said smaller assemblages at different times in the form of said data signals carried on a single communication path, or by storing said assemblages in multiple storage or memory locations, in a manner that is expected to yield no fewer than a required number of said assemblages, said step of transforming and breaking apart comprising
representing said information by N elements of said field or computational structure, grouping said N elements into N/m groups, each containing m elements, where N is greater than m, and hence there are more than one of said groups, selecting a set of vectors $\{a_i:i=1, ..., n\}$, each of said vectors having m elements of said field or computational structure, there being an arbitrarily high probability that any subset of m of the vectors are linearly independent, generating a set of elements $\{C_{i,r}: i=1, \ldots, n, r=1, \ldots, N/m\}$ for assembly into n said assemblages, each element $c_{i,r}$ being generated as the product of a vector $a_i$ times the elements of the r-th said group of elements, and assembling the n assemblages such that the i-th assemblage comprises the elements $\{C_{i,r}: r=1, \ldots, N/m\}$.

2. A method for reconstructing information from m available assemblages that were generated by the process of claim 1, comprising forming m vectors $\{\alpha_i: i=1, \ldots, m\}$ derived from the m vectors $a_i$ that were used to form the elements $c_{i,r}$ of the available m assemblages, generating the N elements which represent the information by multiplying said vectors $\alpha_i$ times vectors of length m formed by taking corresponding single elements, one from each of the m available assemblages, and reassembling the information from the thus generated N elements.

3. A process for protecting against loss and enhancing accessibility in a partitioned or distributed storage or memory system of the kind having portions or components prone to faults or inaccessibilities, of information which is represented in said storage or memory system, said information comprising data elements, each said data element representable as an element of a finite field or computational structure, said process comprising transforming and breaking apart said information into smaller assemblages of elements of said finite field or computational structure, and dispersing said information by storing said assemblages in multiple portions or components of said storage or memory system, in a manner that is expected to yield no fewer than a required number, m, of said assemblages, at least some said assemblages being stored in different said portions or components, retrieving at least said required number of said assemblages from said storage or memory system, and reconstructing said information from said retrieved assemblages, said step of transforming and breaking apart comprising representing said information by N elements of said field or computational structure, grouping said N elements into N/m groups, each containing m elements, where N is greater than m, and hence there are more than one of said groups, selecting a set of vectors $\{a_i: i=1, \ldots, n\}$, each of said vectors having m elements of said field or computational structure, there being an arbitrarily high probability that any subset of m of the vectors are linearly independent, generating a set of elements $\{c_{i,r}: i=1, \ldots, n, r=1, \ldots, N/m\}$ for assembly into n said assemblages, each element $C_{i,r}$ being generated as the product of a vector $a_i$ times the elements of the $r^{th}$ said group of elements, and assembling the n assemblages such that the $i^{th}$ assemblage comprises the elements $\{c_{i,r}, r=1, \ldots, N/m\}$;

said step of reconstructing said information from said retrieved assemblages comprising:

forming m vectors $\{\alpha_i: i=1, \ldots, m\}$ derived from the m vectors $a_i$ that were used to form the elements $c_{i,r}$ of the retrieved assemblages, and generating the N elements which represent the information by multiplying said vectors $\alpha_i$ times vectors of length m formed by taking corresponding single elements, one from each of said retrieved assemblages.

4. A process for protecting against loss and enhancing speed of transmission on communication paths, or information which is represented as data signals on communication paths, said information comprising data elements, each said data element representable as an element of a finite field or computational structure, said communication links being prone to faults or congestions, said process comprising transforming and breaking apart said information into n smaller assemblages of elements of said finite field or computational structure, and dispersing said information by transmitting said smaller assemblages in the form of said data signals carried on multiple communication paths, or by transmitting said smaller assemblages at different times in the form of said data signals carried on a single communication path, in a manner that is expected to yield no fewer than a required number, m, of said assemblages, receiving at least said required number of said assemblages from said paths, and reconstructing said information from said retrieved assemblages, said step of transforming and breaking apart comprising:

representing said information by N elements of said field or computational structure, grouping said N elements into N/m groups, each containing m elements, where m N is greater than m, and hence there are more than one of said groups, selecting a set of vectors $\{a_i: i=1, \ldots, n\}$, each of said vectors having m elements of said field or computational structure, there being an arbitrarily high probability that any subset of m of the vectors are linearly independent, generating a set of elements $\{c_{i,r}: i=1, \ldots, n, r=1, \ldots, N/m\}$ for assembly into n said assemblages, each element $c_{i,r}$ being generated as the product of a vector $a_i$ times the elements of the $r^{th}$ said group of elements, and assembling the n assemblages such that the $i^{th}$ assemblage comprises the elements $\{C_{i,r}: r=1, \ldots, N/m\}$;

said step of reconstructing said information from said received assemblages comprising:

forming m vectors $\{\alpha_i: i=1, \ldots, m\}$ derived from the m vectors $a_i$ that were used to form the elements $c_{i,r}$ of the received assemblages, and, generating the N elements which represent the information by multiplying said vectors $\alpha_i$ times vectors of length m formed by taking corresponding single elements, one from each of said received assemblages.

5. A process for protecting against loss and for enhancing accessibility in storage or memory, and protecting against loss and enhancing speed of transmission in a network, of information which is represented in storage or memory, and represented as data signals on said network, said network and storage or memory being part of a distributed processing system of the kind having nodes associated with storage or memory devices, said nodes being interconnected in said network, and in which said storage or memory devices are prone to faults or inaccessibilities, said process comprising transforming and breaking apart said information into smaller assemblages of elements of said finite field or computational structure, and dispersing said information by transmitting said smaller assemblages in the form of said data signals carried on multiple communication paths, or by transmitting said smaller assemblages at different times in the form of said data signals carried on a single communication path, and by storing said assemblages in multiple said storage or memory devices in said nodes, in a manner that is expected to yield no fewer than a required number, m, of assemblages, retrieving at least said required number of assemblages from said storage or memory devices via said network, and reconstructing said information from said retrieved assemblages, and reassembling the information from the thus generated elements, said step of transforming and breaking apart comprising:
representing said information by N elements of said field or computational structure,
grouping said N elements into N/m groups, each containing m elements, where N is greater than m, and hence there are more than one of said groups,
selecting a set of vectors $\{a_i: i=1, \ldots, n\}$, each of said vectors having m elements of said field or computational structure, there being an arbitrarily high probability that any subset of m of the vectors are linearly independent,
generating a set of elements $\{c_{i,r}: i=1, \ldots, n, r=1, \ldots, N/m\}$ for assembly into n said assemblages, each element $c_{i,r}$ being generated as the product of a vector $\alpha_i$ times the elements of the $r^{th}$ said group of elements, and
assembling the n assemblages such that the $i^{th}$ assemblage comprises the elements $\{c_{i,r}: r=1, \ldots, N/m\}$;

said step of reconstructing said information from said retrieved assemblages comprising:
forming m vectors $\{a_i: i=1, \ldots, m\}$ derived from the m vectors $a_i$ that were used to calculate the elements $c_{i,r}$ of the m retrieved assemblages, and
generating the N elements which represent the information by multiplying said vectors $\alpha_i$ times vectors of length m formed by taking corresponding single elements, one from each of said retrieved assemblages.

6. A method for communicating information packets among the nodes of a parallel processing computer, each node having an associated processor, memory, information dispersal/reconstruction unit, and a buffer, said nodes being linked by an interconnection network, whereby each node can communicate with any other node via paths at least some of which pass through intermediate nodes, said paths being subject to failure, and each said node's buffer having a finite capacity, each information packet being sent from a source node to a destination node, said information packet comprising data elements, each said data element representable as an element of a finite field or computational structure, said method comprising transforming and breaking apart said information packet into n assemblages by
representing said information packet by N elements of said field or computational structure,
grouping said N elements into N/m groups, each containing m elements, where N is greater than m, and hence there are more than one of said groups,
selecting a set of vectors $\{a_i: i=1, \ldots, n\}$, each of said vectors having m elements of said field or computational structure, there being an arbitrarily high probability that any subset of m of the vectors are linearly independent,
generating a set of elements $\{c_{i,r}: i=1, \ldots, n, r=1, \ldots, N/m\}$ for assembly into n said assemblages, each element $c_{i,r}$ being generated as the product of a vector $a_i$ times the elements of the r-th said group of elements, and
assembling the n pieces such that the i-th assemblage comprises the elements $\{c_{i,r}: r=1, \ldots, N/m\}$, sending said assemblages via different said paths of said network toward said destination node, receiving at said destination node at least said m assemblages from network, and reconstructing said information packet from said m assemblages by
forming m vectors $\{\alpha_i: i=1, \ldots, m\}$ derived from the m vectors $a_i$ that were used to form the elements $c_{i,r}$ of the available m assemblages,
generating the N elements which represent the information by multiplying said vectors $\alpha i$ times vectors of length m formed by taking corresponding single elements, one from each of the m available assemblages, and reassembling the information from the thus generated N elements.

7. The method of claim 1, 2, 3, 4, 5 or 6 wherein said elements comprise equal-sized bytes.

8. The method of claim 7 wherein said elements are members of a field having at least as many elements as the number of possible values of said byte.

9. The method of claim 8 wherein said field has no more elements than said number of possible values.

10. The method of claim 8 wherein the field is the field $Z_p$ of residues (mod p) where p is a prime number greater than the highest-valued possible said byte.

11. The method of claim 1, 2, 3, 4, 5, or 6 wherein said information is represented as a string of said elements, and said groups comprise segments of said string, each segment being a sequence of successive said elements.

12. The method of claim 1, 2, 3, 4, 5, or 6 further comprising
generating fingerprints based on said pieces, communicating or storing said fingerprints, and testing said fingerprints for authenticity as the basis for deciding whether to accept any of said pieces for the process of reconstructing the information.

13. The method of claim 3 wherein a fault or inaccessibility of a given portion or component does not necessarily also entail a fault or inaccessibility of another said portion or component.

14. The method of claim 4 wherein a fault or congestion of a given link at a given time does not necessarily also entail a fault or congestion of said given link at another time or a fault or congestion of another said link.

15. The method of claim 5 wherein a fault or inaccessibility of a given storage device does not necessarily also entail a fault or inaccessibility of another said storage device.

16. The method of claim 6 wherein a failure or congestion of a given path at a given time does not necessarily also entail a failure or congestion of said given path at another time or a failure or congestion of another path.

17. The method of claim 8 wherein the field is the field $GF(2^q)$ for q-bit long bytes.

18. Apparatus for for protecting against loss and for enhancing accessibility in storage or memory, or protecting against loss and enhancing speed of transmission on communication paths, of information which is represented in storage or memory, or represented as data signals on communication paths, said information comprising data elements, each said data element representable as an element of a finite field or computational structure, said apparatus comprising means for transforming and breaking apart said information among a set of smaller assemblages of elements of said finite field or computational structure and a disperser for dispersing said information by transmitting said smaller assemblages in the form of said data signals carried on multiple communication paths, or by transmitting said smaller assemblages at different times in the form of said data signals carried on a single communication path, or by storing said assemblages in multiple storage or memory locations, in a manner that is expected to yield no fewer than a required number of said assemblages, said means for transforming and breaking apart comprising a converter for representing said information by N elements of said field or computational structure, a segmenter for grouping said N elements into N/m groups, each containing m elements, where N is greater than m, and hence there are more than one of said groups, a vector generator for selecting a set of vectors $\{a_i: i=1, \ldots, n\}$, each of said vectors having m elements of said field or computational structure, there being an arbitrarily high probability that any subset of m of the vectors are linearly independent, a calculator for calculating a set of elements $\{c_{i,r}: i=1, \ldots, n, r=1, \ldots, N/m\}$ for assembly into n said assemblages, each element $c_{i,r}$ being calculated as the product of a vector $a_i$ times the elements of the $r^{th}$ said group of elements, and an assembler for assembling the n assemblages such that the $i^{th}$ assemblage comprises the elements $\{c_{i,r}: r=1, \ldots, N/m\}$.

19. Apparatus for reconstructing information from an available set of m assemblages that were generated by dispersing the information, by, representing said information packet by N elements of a field or computational structure, grouping said N elements into N/m groups, each containing m elements, where N is greater than m, and hence there are more than one of said groups, selecting a set of vectors $\{a_i: i=1, \ldots, n\}$, each of said vectors having m elements of said field or computational structure, there being an arbitrarily high probability that any subset of m of the vectors are linearly independent, generating a set of elements $\{c_{i,r}: i=1, \ldots, n, r=1, \ldots, N/m\}$ for assembly into n said assemblages, each element $c_{i,r}$ being generated as the product of a vector $a_i$ times the elements of the r-th said group of elements, and assembling the n pieces such that the i-th assemblage comprises the elements $\{c_{i,r}: r=1, \ldots, N/m\}$, the apparatus comprising a matrix processor for forming an m×m matrix whose rows are the m vectors $a_i$ that were used to form the characters $c_{i,r}$ of the available m assemblages, and for inverting the m× m matrix, a calculator for generating the N characters of the data signal by multiplying the inverted matrix times groups of the elements $c_{i,r}$, and an assembler for reassembling the N characters to form the information.

20. The apparatus of claim 18 or 19 wherein said calculator comprises a memory and an associated processor.

21. The apparatus of claim 20 wherein said memory comprises a high-speed cache memory.

22. The apparatus of claim 20 wherein said processor comprises an arithmetic unit, a vector processor, a systolic array processor, or a set of any of them in parallel.

23. Apparatus for protecting against loss and enhancing accessibility in a partitioned or distributed storage or memory system of the kind having portions or components prone to faults or inaccessibilities, of information which is represented in said storage or memory system., said information comprising data elements, each said data element representable as an element of a finite field or computational structure, said apparatus comprising:

means for transforming and breaking apart said information into smaller assemblages of elements of said finite field or computational structure, storage or memory for storing said assemblages in said portions or components of said storage or memory system, at least some pieces being stored in different said portions or components, said means for transforming and breaking apart comprising a converter for representing said information by N elements of a field or computational structure, a segmenter for grouping said N elements into N/m groups of m elements, where m is less than N, a vector generator for selecting a set of vectors $\{a_i: i=1, \ldots, n\}$ each having m elements of said field or computational structure, there being an arbitrarily high probability that any subset of m of the vectors are linearly independent, a calculator for calculating a set of elements $\{c_{i,r}: i=1, \ldots, n, r=1, \ldots, N/m\}$ for assembly into said n assemblages, each element $c_{i,r}$ being calculated as the product of a vector $a_i$ times the elements of the $r^{th}$ said group of elements, and an assembler for generating the n assemblages such that the $i^{th}$ assemblage comprises the elements $\{c_{i,r}: r=1, \ldots, N/m\}$; and a reconstructor for retrieving at least m of said assemblages from portions or components of said storage or memory system, and for reconstructing said information from said m retrieved assemblages, said reconstructor comprising a processor for forming m vectors $\{\alpha_i: i=1, \ldots, m\}$ derived from the m vectors $a_i$ that were used to calculate the elements $c_{i,r}$ of the m retrieved assemblages, a calculator for generating the N elements which represent the information by multiplying said vectors $\alpha_i$ times vectors of length m formed by taking corresponding single elements, one from each of said m retrieved assemblages, and an assembler for reassembling the information from the thus generated N elements.

24. The apparatus of claim 23 wherein a fault or inaccessibility of a given portion or component does not necessarily also entail a fault or inaccessibility of another said portion or component.

25. Apparatus for a process for protecting against loss and enhancing speed of transmission on communication paths, of information which is represented as data signals on communication paths, said information comprising data elements, each said data element representable as an element of a finite field or computational element, said communication links being prone to faults or congestions, said apparatus comprising a disperser for dispersing said information into n smaller assemblages, and for transmitting said n assemblages in the form of said data signals carried on multiple communication paths, or by transmitting said smaller assemblages at different times in the form of said data signals carried on a single communication path, in a manner that is expected to yield no fewer than a required number, m, of said assemblages, said disperser comprising a converter for representing said information by N elements of a field or computational structure, a segmenter for grouping said N elements into N/m groups of m elements, where m is less than N, a vector generator for selecting a set of vectors $\{a_i: i=1,\ldots,n\}$ each having m elements of said field or computational structure, there being an arbitrarily high probability that any subset of m of the vectors are linearly independent, a calculator for calculating a set of elements $\{c_{i,r}: i=1, \ldots, n, r=1, \ldots, N/m\}$ for assembly into said n assemblages, each element $c_{i,r}$ being calculated as the product of a vector $a_i$ times the elements of the $r^{th}$ said group of elements, and an assembler for generating the n assemblages such that the $i^{th}$ assemblage comprises the elements $\{c_{i,r}: r=1, \ldots, N/m\}$; and a reconstructor for receiving at least m of said assemblages from said, paths and for reconstructing said information from said m received paths, said reconstructor comprising a processor for forming m vectors $\{\alpha_i: i=1, \ldots, m\}$ derived from the m vectors $a_i$ that were used to calculate the elements $c_{i,r}$ of the m received assemblages, a calculator for generating the N elements which represent of the information by multiplying said vectors $\alpha_i$ times vectors of length m formed by taking corresponding single elements, one from each of said m received assemblages, and an assembler for reassembling the information from the thus generated N elements.

26. The apparatus of claim 25 wherein a fault or congestion of a given link at a given time does not necessarily also entail a fault or congestion of said given link at another time or a fault or congestion of another said link.

27. Apparatus for protecting against loss and for enhancing accessibility in storage or memory, and protecting against loss and enhancing speed of transmission in a network, or information which is represented in storage or memory and represented as data signals on said network, said network and storage or memory being part of a distributed processing system of the kind having nodes with associated storage or memory devices, said nodes being interconnected in said network, and in which said storage or memory devices are prone to faults or inaccessibilities, said apparatus comprising a disperser for dispersing said information into n smaller assemblages, and for distributing said n assemblages to said storage or memory devices at different said nodes via said network, said disperser comprising a converter for representing said information by N elements of a field or computational structure, a segmenter for grouping said N elements into N/m groups of m elements, where m is less than N, a vector generator for selecting a set of vectors $\{a_i: i=1, \ldots, n\}$ each having m elements of said field or computational structure, there being an arbitrarily high probability that any subset of m of the vectors are linearly independent, a calculator for calculating a set of elements $\{c_{i,r}: i=1, \ldots, n, r=1, \ldots, N/m\}$ for assembly into said n assemblages, each element $c_{i,r}$ being calculated as the product of a vector $a_i$ times the elements of the $r^{th}$ said group of elements, and an assembler for generating the n assemblages such that the $i^{th}$ piece is an assemblage of the elements $\{c_{i,r}: r=1, \ldots, N/m\}$; and a reconstructor for retrieving at least m of said assemblages from said storage or memory devices via said network, and for reconstructing said information from said m retrieved assemblages, said reconstructor comprising a processor for forming m vectors $\{\alpha_i: i=1, \ldots, m\}$ derived from the m vectors $a_i$ that were used to calculate the elements $c_{i,r}$ of the m retrieved assemblages, a calculator for generating the N elements which represent the information by multiplying said vectors $\alpha_i$ times vectors of length m formed by taking corresponding single elements, one from each of said m retrieved assemblages, and an assembler for reassembling the information from the thus generated N elements.

28. The apparatus of claim 27 wherein a fault or inaccessibility of a given storage device does not necessarily also entail a fault or inaccessibility of another said storage device.

29. Apparatus for communicating information packets among the nodes of a parallel processing computer, each node having an associated processor and memory, said nodes being linked by an interconnection network, whereby each node can communicate with any other node via paths at least some of which pass through intermediate nodes, said paths being subject to failure, and each said node's memory having a finite capacity, each information packet being sent from a source node to a destination node, said information packet comprising data elements, each said data element representable as an element of a finite field or computational structure, said apparatus comprising a disperser for transforming and breaking apart said information packet into n assemblages, and for sending said assemblages via different said paths of said network toward said destination node the transforming and breaking apart being done in accordance with the following method, by representing said information packet by N elements of said field or computational structure, grouping said N elements into N/m groups, each containing m elements, where N is greater than m, and hence there are more than one of said groups, selecting a set of vectors $\{a_i: i=1, \ldots, n\}$, each of said vectors having m elements of said field or computational structure, there being an arbitrarily high probability that any subset of m of the vectors are linearly independent, generating a set of elements $\{c_{i,r}: i=1, \ldots, n, r=1, \ldots, N/m\}$ for assembly into n said assemblages, each element $c_{i,r}$ being generated as the product of a vector $a_i$ times the elements of the r-th said group of elements, and assembling the n pieces such that the i-th assemblage comprises the elements $\{c_{i,r}: r=1, \ldots, N/m\}$, and a reconstructor for receiving at said destination node at least said m assemblages from said network, and for reconstructing said information packet from said m assemblages by forming m vectors $\{\alpha_i: i=1, \ldots, m\}$ derived from the m vectors $a_i$ that were used to form the elements $c_{i,r}$ of the available m assemblages, generating the N elements which represent the information by multiplying said vectors $\alpha_i$ times vectors of length m formed by taking corresponding single elements, one from each of the m available assemblages, and reassembling the information from the thus generated N elements.

30. The apparatus of claim 29 wherein a failure or congestion of a given path at a given time does not necessarily also entail a failure or congestion of said given path at another time or a failure or congestion of another path.

* * * * *